(12) United States Patent
Hara et al.

(10) Patent No.: US 12,023,984 B2
(45) Date of Patent: Jul. 2, 2024

(54) COMPRESSOR INSTALLATION STRUCTURE FOR VEHICLE

(71) Applicant: TOYOTA JIDOSHA KABUSHIKI KAISHA, Aichi-ken (JP)

(72) Inventors: Yasuhiro Hara, Nagoya (JP); Jumpei Watanabe, Nagakute (JP); Norimasa Koreishi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 361 days.

(21) Appl. No.: 17/498,747

(22) Filed: Oct. 12, 2021

(65) Prior Publication Data

US 2022/0118927 A1    Apr. 21, 2022

(30) Foreign Application Priority Data

Oct. 16, 2020   (JP) .................................. 2020-174964

(51) Int. Cl.
*B60H 1/00* (2006.01)
*B60H 1/32* (2006.01)
*B60R 16/08* (2006.01)

(52) U.S. Cl.
CPC ....... *B60H 1/00392* (2013.01); *B60H 1/3223* (2013.01); *B60R 16/08* (2013.01)

(58) Field of Classification Search
CPC ............ B60H 1/00357; B60H 1/00385; B60H 1/00392; B60K 1/00; B60K 1/04; B60R 16/08; B62D 21/00; B62D 21/02; B62D 21/15

USPC .................................. 296/187.01, 187.06
See application file for complete search history.

(56) References Cited

U.S. PATENT DOCUMENTS

| | | | |
|---|---|---|---|
| 10,293,706 B2* | 5/2019 | Porras | B60H 1/00385 |
| 10,493,819 B2* | 12/2019 | Zenner | B60H 1/00271 |
| 10,967,915 B2* | 4/2021 | Hashida | B62D 21/11 |
| 11,492,044 B2* | 11/2022 | Shimokouchi | B62D 21/152 |
| 2013/0199225 A1* | 8/2013 | Lee | F25B 30/02 62/176.1 |
| 2016/0167522 A1 | 6/2016 | Chen et al. | |
| 2016/0209099 A1* | 7/2016 | Liu | F25B 49/025 |
| 2020/0062097 A1* | 2/2020 | Hara | B60L 50/66 |
| 2020/0062133 A1 | 2/2020 | Tsuruta et al. | |
| 2020/0070640 A1 | 3/2020 | Murai | |
| 2021/0129652 A1 | 5/2021 | Murai | |

FOREIGN PATENT DOCUMENTS

| | | |
|---|---|---|
| JP | 2007-290645 A | 11/2007 |
| JP | 2016-530149 A | 9/2016 |
| JP | 2018-034647 A | 3/2018 |
| JP | 202029134 A | 2/2020 |
| JP | 202037313 A | 3/2020 |

* cited by examiner

*Primary Examiner* — Jason S Daniels
(74) *Attorney, Agent, or Firm* — HAUPTMAN HAM, LLP (57) ABSTRACT

A compressor installation structure for a vehicle has: a battery that is disposed at a vehicle lower side of a floor portion of a vehicle cabin; a power unit that is disposed at one side in a vehicle front-rear direction with respect to the battery; and a compressor that is configured to be driven by electric power supplied thereto from the battery, and that is disposed at one side in the vehicle front-rear direction with respect to the battery, and that is disposed at another side in a vehicle front-rear direction with respect to the power unit.

9 Claims, 3 Drawing Sheets

COMPRESSOR INSTALLATION STRUCTURE FOR VEHICLE

CROSS-REFERENCE TO RELATED APPLICATION

This application is based on and claims priority under 35 USC 119 from Japanese Patent Application No. 2020-174964 filed on Oct. 16, 2020, the disclosure of which is incorporated by reference herein.

BACKGROUND

Technical Field

The present disclosure relates to a compressor installation structure for a vehicle.

Related Art

A disclosure relating to an electric automobile is disclosed in Japanese Patent Application Laid-Open (JP-A) No. 2020-29134. In this electric automobile, the battery is disposed beneath the floor of the vehicle cabin, and the power unit is disposed at a vehicle front-rear direction one side of the battery. High-voltage parts, which are the traveling devices, and a control unit are disposed at the vehicle front-rear direction one side of the battery and further toward the vehicle front-rear direction inner side than a vehicle front-rear direction one side end portion of the power unit. Therefore, collision load in the vehicle front-rear direction that is input to the vehicle is input to the battery or the driving unit before the traveling devices, and therefore, the collision load affecting the traveling devices can be suppressed.

However, in JP-A No. 2020-29134, parts that protect a compressor that is installed in the vehicle are not disposed at the periphery of the compressor. Therefore, there is room for improvement from the standpoint of suppressing the collision load, which is in the vehicle front-rear direction and is input to the vehicle, affecting the compressor.

SUMMARY

In view of the above-described circumstances, an object of the present disclosure is to provide a compressor installation structure for a vehicle in which a collision load, which is in the vehicle front-rear direction and is input to the vehicle, affecting a compressor can be suppressed.

A compressor installation structure for a vehicle of a first aspect of the present disclosure has: a battery that is disposed at a vehicle lower side of a floor portion of a vehicle cabin; a power unit that is disposed at one side in a vehicle front-rear direction with respect to the battery; and a compressor that is configured to be driven by electric power supplied thereto from the battery, and that is disposed at one side in the vehicle front-rear direction with respect to the battery, and that is disposed at another side in a vehicle front-rear direction with respect to the power unit.

In accordance with the first aspect of the present disclosure, a compressor, and a battery that supplies electric power to the compressor, are provided. A gas is compressed by the compressor, and the compressed gas can be sent to various devices.

By the way, it is thought that, when collision load is input to the compressor, compressed gas is jetted-out from the compressor, or the like. Accordingly, when collision load in the vehicle front-rear direction is input to the vehicle, it is preferable to be able to suppress inputting of this collision load to the compressor.

Here, in the present disclosure, the battery is disposed at the vehicle lower side of the floor portion of the vehicle cabin, and the power unit is disposed at a vehicle front-rear direction one side with respect to the battery. Further, the compressor is disposed at a vehicle front-rear direction one side with respect to the battery, and is disposed at a vehicle front-rear direction another side with respect to the power unit.

Therefore, in the present disclosure, collision load in the vehicle front-rear direction that is input to the vehicle is input to the battery or the power unit before the compressor.

In a compressor installation structure for a vehicle of a second aspect of the present disclosure, in the first aspect, a pair of compressors are disposed with an interval provided therebetween in a vehicle width direction.

In accordance with the second aspect of the present disclosure, the pair of compressors are disposed with an interval therebetween in the vehicle width direction, and these compressors can be used for different applications. Further, collision load in the vehicle front-rear direction that is input to the vehicle can be input to the battery or the power unit, before these compressors.

In a compressor installation structure for a vehicle of a third aspect of the present disclosure, in the second aspect, one of the compressors is a compressor for cleaning that is configured to supply compressed air, and the compressor installation structure for a vehicle further comprises a tube portion for cleaning, having an end portion that opens toward a detection surface of a sensor configured to acquire a peripheral situation of the vehicle and disposed at one side, in the vehicle front-rear direction, of the compressor for cleaning, the tube portion for cleaning extending from the compressor for cleaning toward one side in the vehicle front-rear direction, and being configured to supply the compressed air from the compressor for cleaning.

In accordance with the third aspect of the present disclosure, a sensor that can acquire the situation at the periphery of the vehicle, and a tube portion for cleaning, are provided. The end portion of the tube portion for cleaning opens toward the detection surface of the sensor.

Further, in the present disclosure, one compressor among the pair of compressors is a compressor for cleaning. Compressed air is supplied from this compressor for cleaning to the tube portion for cleaning. As a result, the compressed air that is supplied to the tube portion for cleaning is jetted-out from the end portion of the tube portion for cleaning toward the detection surface of the sensor, and can clean the detection surface.

Further, the sensor is disposed at a vehicle front-rear direction one side of the compressor for cleaning, and the tube portion for cleaning extends from the compressor for cleaning toward a vehicle front-rear direction one side. Therefore, the tube portion for cleaning, i.e., the route of the compressed air, becoming long can be suppressed.

In a compressor installation structure for a vehicle of a fourth aspect of the present disclosure, in the third aspect, another of the compressors is a compressor for air conditioning that is configured to compress coolant that is used in an air conditioner, and the compressor installation structure for a vehicle further comprises a tube portion for air conditioning that is connected to a condenser, which is configured to condense the coolant by heat exchange with air, which is disposed at one side, in the vehicle front-rear direction, of the compressor for air conditioning and which structures a portion of the air conditioner, the tube portion for air conditioning extending from the compressor for air conditioning toward one side in the vehicle front-rear direction one side, and the coolant, which has been compressed by the compressor for air conditioning, being delivered to the tube portion for air conditioning.

In accordance with the fourth aspect of the present disclosure, the condenser that structures a portion of the air conditioner, and the tube portion for air conditioning, are provided. The tube portion for air conditioning is connected to the condenser.

Further, in the present disclosure, another compressor among the pair of compressors is a compressor for air conditioning. Coolant of the air conditioner, which has been compressed by the compressor for air conditioning, is sent to the tube portion for air conditioning. On the other hand, the coolant, which has been sent from the compressor for air conditioning via the tube portion for air conditioning, is condensed at the condenser by heat exchange with air.

Further, the condenser is disposed at a vehicle front-rear direction one side of the compressor for air conditioning, and the tube portion for air conditioning extends from the compressor for air conditioning toward a vehicle front-rear direction one side. Therefore, the tube portion for air conditioning, i.e., the route of the coolant, becoming long can be suppressed.

In a compressor installation structure for a vehicle of a fifth aspect of the present disclosure, any one of the first through fourth aspects further has a frame that is disposed at a vehicle lower side of a vehicle body that is provided with the vehicle cabin, that is configured to support the vehicle body from the vehicle lower side, and that has a pair of side frame portions that are disposed with an interval provided therebetween in the vehicle width direction and extend in the vehicle front-rear direction, and a cross portion that spans between the side frame portions, wherein: the cross portion is disposed at another side in the vehicle front-rear direction with respect to the power unit, and the compressor is disposed at another side in the vehicle front-rear direction with respect to the cross portion.

In accordance with the fifth aspect of the present disclosure, the frame is disposed at the vehicle lower side of the vehicle body that has the vehicle cabin, and the vehicle body is supported from the vehicle lower side by the frame. Further, the frame has the pair of side frame portions, which are disposed with an interval therebetween in the vehicle width direction and which extend in the vehicle front-rear direction, and the cross portion that spans between these side frame portions.

Here, in the present disclosure, the cross portion is disposed at a vehicle front-rear direction another side with respect to the power unit, and the compressor is disposed at a vehicle front-rear direction another side with respect to the cross portion. Therefore, collision load from a vehicle front-rear direction one side, which is input to the vehicle, is input to the cross portion before the compressor.

As described above, the compressor installation structure for a vehicle of the first aspect of the present disclosure has the excellent effect that collision load in the vehicle front-rear direction, which is input to the vehicle, affecting a compressor can be suppressed.

The compressor installation structure for a vehicle of the second aspect of the present disclosure has the excellent effect that a pair of compressors can be protected from collision load in the vehicle front-rear direction that is input to the vehicle.

The compressor installation structure for a vehicle of the third aspect of the present disclosure has the excellent effect that piping relating to the cleaning of a sensor can be simplified, while the performance of the sensor is maintained.

The compressor installation structure for a vehicle of the fourth aspect of the present disclosure has the excellent effect that the piping at the periphery of an air conditioner can be simplified.

The compressor installation structure for a vehicle of the fifth aspect of the present disclosure has the excellent effect that collision load from a vehicle front-rear direction one side, which is input to the vehicle, affecting a compressor can be suppressed.

BRIEF DESCRIPTION OF THE DRAWINGS

Exemplary embodiments of the present disclosure will be described in detail based on the following figures, wherein.

DETAILED DESCRIPTION

An example of an embodiment of a compressor installation structure for a vehicle relating to the present disclosure is described hereinafter by using FIG. 1 through FIG. 3. Note that arrow FR that is shown appropriately in the respective drawings indicates the vehicle front side, arrow UP indicates the vehicle upper side, and arrow RH indicates the vehicle width direction right side.

Figure 1:
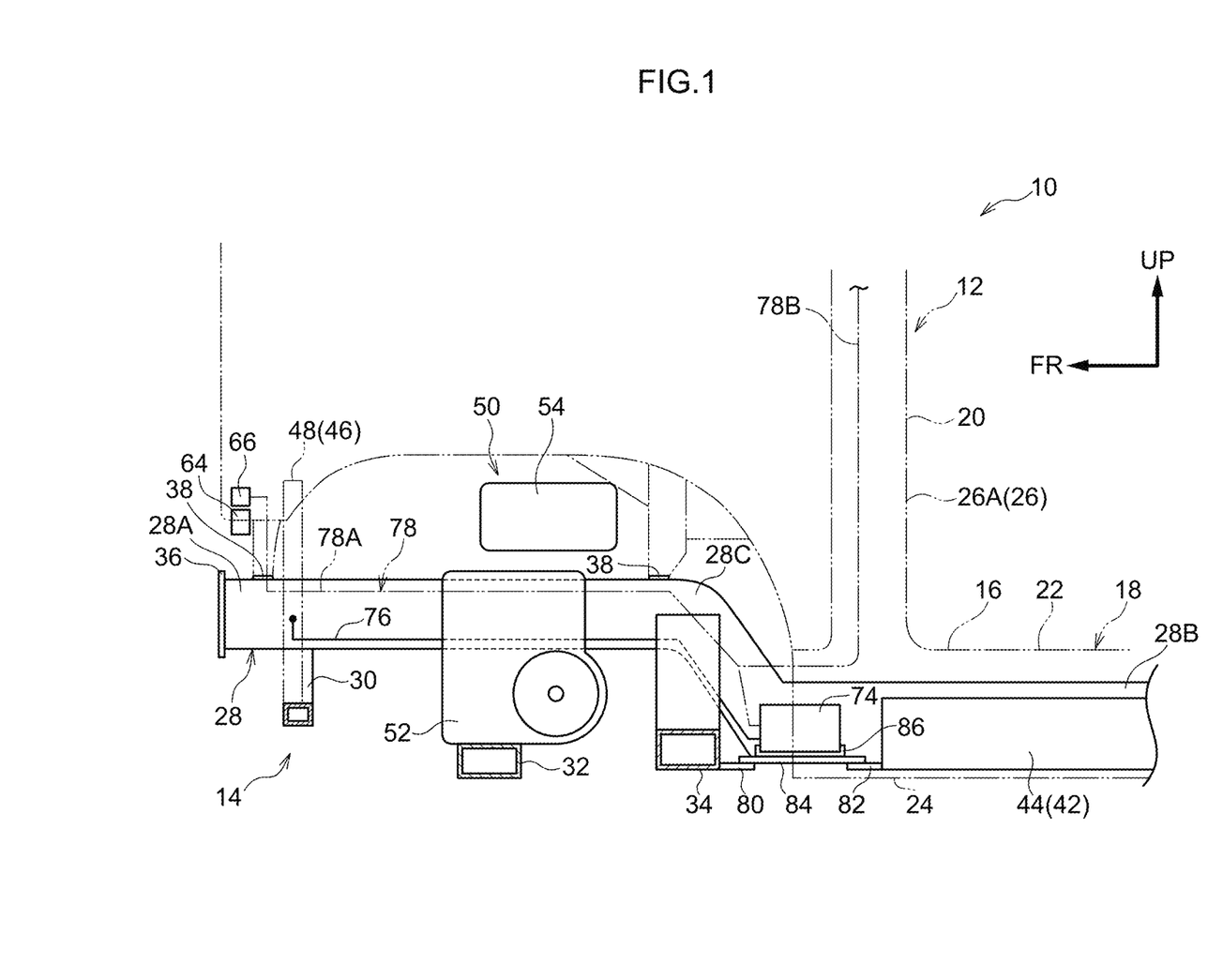
FIG. 1 is a cross-sectional view that is seen from a vehicle width direction and that schematically shows the structure of a vehicle to which is applied a compressor installation structure for a vehicle relating to a present embodiment (a cross-sectional view showing the state cut along line 1-1 of FIG. 2)

As shown in FIG. 1, a "vehicle 10", to which the compressor installation structure for a vehicle relating to the present embodiment is applied, has a "vehicle body 12" that is made of steel and a "frame 14" that is made of steel and supports the vehicle body 12, and has a so-called frame structure.

The vehicle body 12 is the shape of a box whose outer shape is a substantially rectangular parallelopiped that extends in the vehicle front-rear direction, and the vehicle body 12 structures the main portion of a "vehicle cabin 16". Note that the vehicle body 12 and the frame 14 are structures that are basically symmetrical in the vehicle width direction and the vehicle front-rear direction.

The vehicle body 12 is structured to include an unillustrated roof portion that structures the portion at the vehicle upper side of the vehicle cabin 16, a "floor portion 18" that serves as the floor and structures the portion at the vehicle lower side of the vehicle cabin 16, and four pillar portions 20 that connect the roof portion and the floor portion 18 in the vehicle vertical direction.

The floor portion 18 is structured to include a floor panel 22 and a pair of rockers 24. The floor panel 22 is shaped as a plate that extends in the vehicle front-rear direction and the vehicle width direction, and structures the floor surface of the vehicle cabin 16.

On the other hand, the rockers 24 extend in the vehicle front-rear direction along the vehicle width direction outer side peripheral edge portions of the floor panel 22. The rockers 24 are closed cross-sectional structures whose cross-sections as seen from the vehicle front-rear direction are closed cross-sections.

The pillar portions 20 structure portions of the side portions of the vehicle body 12, and are disposed along peripheral edge portions 26A, which extend in the vehicle vertical direction, of opening portions 26 that are opened and closed by unillustrated sliding doors, and the pillar portions 20 extend in the vehicle vertical direction. These pillar portions 20 are closed cross-sectional structures whose cross-sections as seen from the vehicle vertical direction are closed cross-sections.

Figure 2:
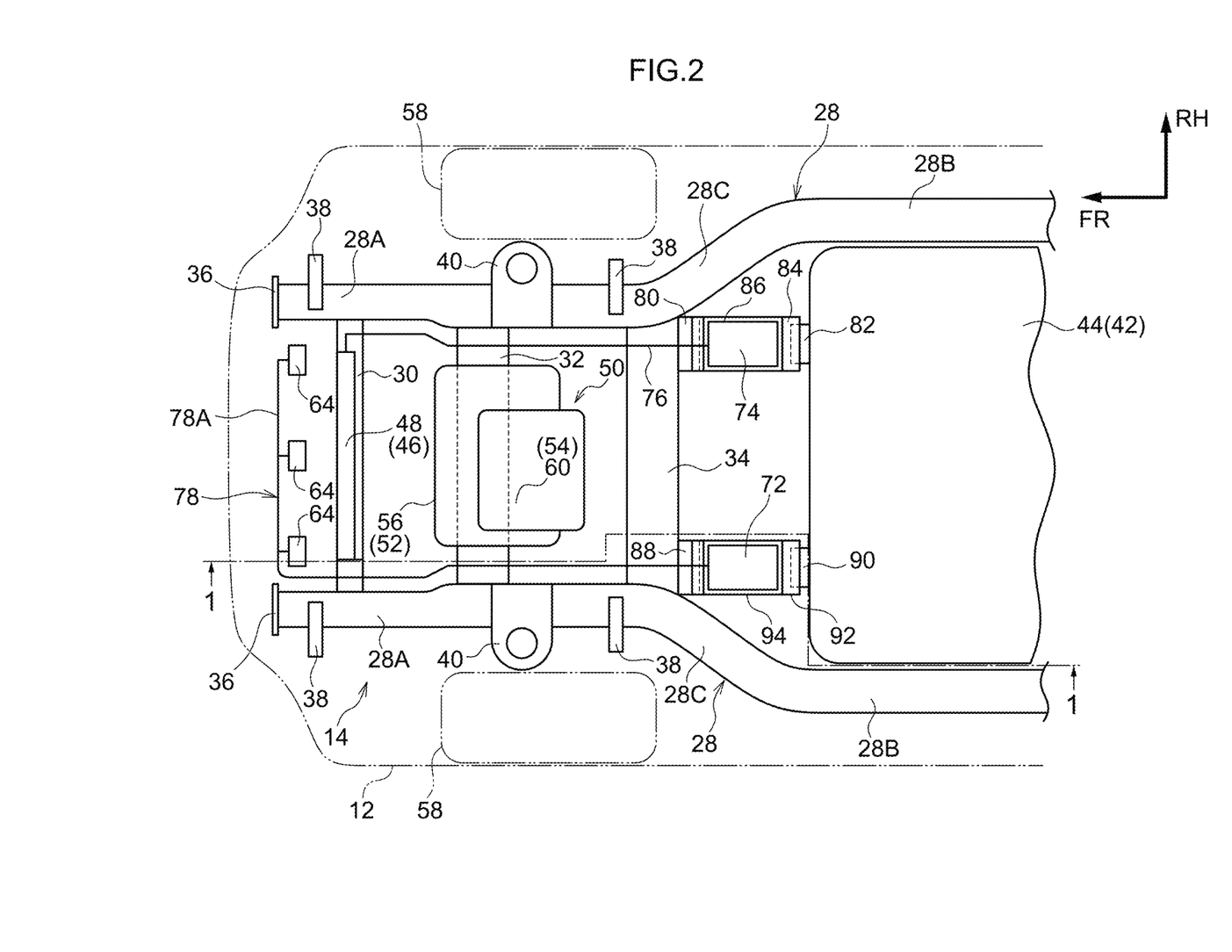
FIG. 2 is a plan view schematically showing the structure of the vehicle to which is applied the compressor installation structure for a vehicle relating to the present embodiment.

On the other hand, as shown in FIG. 2 as well, the frame 14 has a pair of "side frame portions 28" which are disposed with an interval therebetween in the vehicle width direction, and a first cross portion 30, a second cross portion 32 and a "third cross portion 34" that span between the side frame portions 28.

The side frame portion 28 extends overall in the vehicle front-rear direction, and is structured to include a front frame portion 28A, a main frame portion 28B and a kick portion 28C, and is a closed cross-sectional structure whose cross-section, as seen from the vehicle front-rear direction, is a closed cross-section.

In further detail, the front frame portions 28A structure the vehicle front side portions of the side frame portions 28, and extend rectilinearly in the vehicle front-rear direction. Mounting plate portions 36 are provided at the vehicle front side end portions of the front frame portions 28A. An unillustrated bumper reinforcement is mounted to these mounting plate portions 36.

Further, pairs of mounting portions 38 that support the vehicle body 12 are provided at the front frame portions 28A. Suspension towers 40 are provided at the front frame portions 28A, between the mounting portions 38. Unillustrated shock absorbers and the like are mounted to the suspension towers 40.

The main frame portions 28B structure the vehicle front-rear direction central portions of the side frame portions 28, and are disposed at the vehicle width direction outer sides and the vehicle lower sides of the front frame portions 28A, and extend rectilinearly in the vehicle front-rear direction.

A "battery pack 42", which serves as a battery that can supply electric power to a "power unit 50" that is described later, is disposed between the main frame portions 28B. The battery pack 42 is structured to include a battery case 44, which is formed of an aluminum alloy and structures the outer case of the battery pack 42, and unillustrated, plural battery modules that are disposed at the inner side of the battery case 44.

Note that, as seen from the vehicle width direction, the battery pack 42 is disposed such that the main portion thereof fits between the upper surfaces and the lower surfaces of the main frame portions 28B. Further, as seen from the vehicle width direction, the battery pack 42 is disposed so as to overlap the rockers 24 of the vehicle body 12. The battery pack 42 is mounted by unillustrated fastening members to the lower surfaces of the main frame portions 28B.

The kick portions 28C are interposed between the front frame portions 28A and the main frame portions 28B. As seen from the vehicle vertical direction, the kick portions 28C extend-out from the front frame portions 28A toward the vehicle rear side and the vehicle width direction outer sides, and, as seen from the vehicle width direction, the kick portions 28C extend-out from the front frame portions 28A toward the vehicle rear side and the vehicle lower side.

The first cross portion 30 extends in the vehicle width direction, and, at the vehicle lower sides of the mounting portions 38 that are at the vehicle front side, connects the front frame portions 28A together in the vehicle width direction. Further, the first cross portion 30 is supported from the vehicle lower side by a "condenser 48" that structures a portion of an "air conditioner 46" that is installed in the vehicle 10. This condenser 48 can condense a coolant, which has been compressed by a compressor 74 for air conditioning" that is described later, by heat exchange with air.

The second cross portion 32 extends in the vehicle width direction, and, at the vehicle lower sides of the suspension towers 40, connects the front frame portions 28A together in the vehicle width direction. Further, plural motor mounting portions that are not illustrated are provided at the second cross portion 32. A motor 52 that structures a portion of the power unit 50 is mounted to these motor mounting portions, and the motor 52 is in a state of being supported from the vehicle lower side by the second cross portion 32.

The third cross portion 34 extends in the vehicle width direction, and, at the border portions of the front frame portions 28A with the kick portions 28C, connects the front frame portions 28A in the vehicle width direction.

The structure of the power unit 50 is described next. As shown in FIG. 1 and FIG. 2, the power unit 50 is structured to include the motor 52 and an electric power supplying section 54. The power unit 50 is disposed between the side frame portions 28, between the first cross portion 30 and the third cross portion 34.

The motor 52 has a housing 56 that structures the outer case thereof. A motor main body portion, a counter gear mechanism and a differential gear mechanism, none of which are illustrated, are disposed at the inner side of the housing 56. The motor main body portion is driven due to electric power being supplied thereto. The driving force of the motor main body portion is transmitted via the counter gear mechanism and the differential gear mechanism to an unillustrated pair of driving shafts, and drives driving wheels 58 (front wheels).

On the other hand, the electric power supplying section 54 is disposed at the vehicle upper side of the motor 52. This electric power supplying section 54 is structured to include a housing 60 that is the shape of a box whose outer shape is substantially rectangular parallelopiped, and plural, unillustrated electronic devices that are built-in the inner side of the housing 60.

In detail, a high-voltage junction box, a DC charging relay, an AC charger, a DC/DC inverter, and the like are disposed at the inner side of the housing 60. The electric power supplying section 54 is electrically connected, via unillustrated wire harnesses, to the battery pack 42, the motor 52, the compressor 74 for air conditioning and a "compressor 72 for cleaning" that are described later. Electric power is supplied from the battery pack 42 via the electric power supplying section 54 to the motor 52, the compressor 74 for air conditioning, and the compressor 72 for cleaning. Note that the electric power supplying section 54 is mounted to the frame 14 via unillustrated mounting members.

Figure 3:
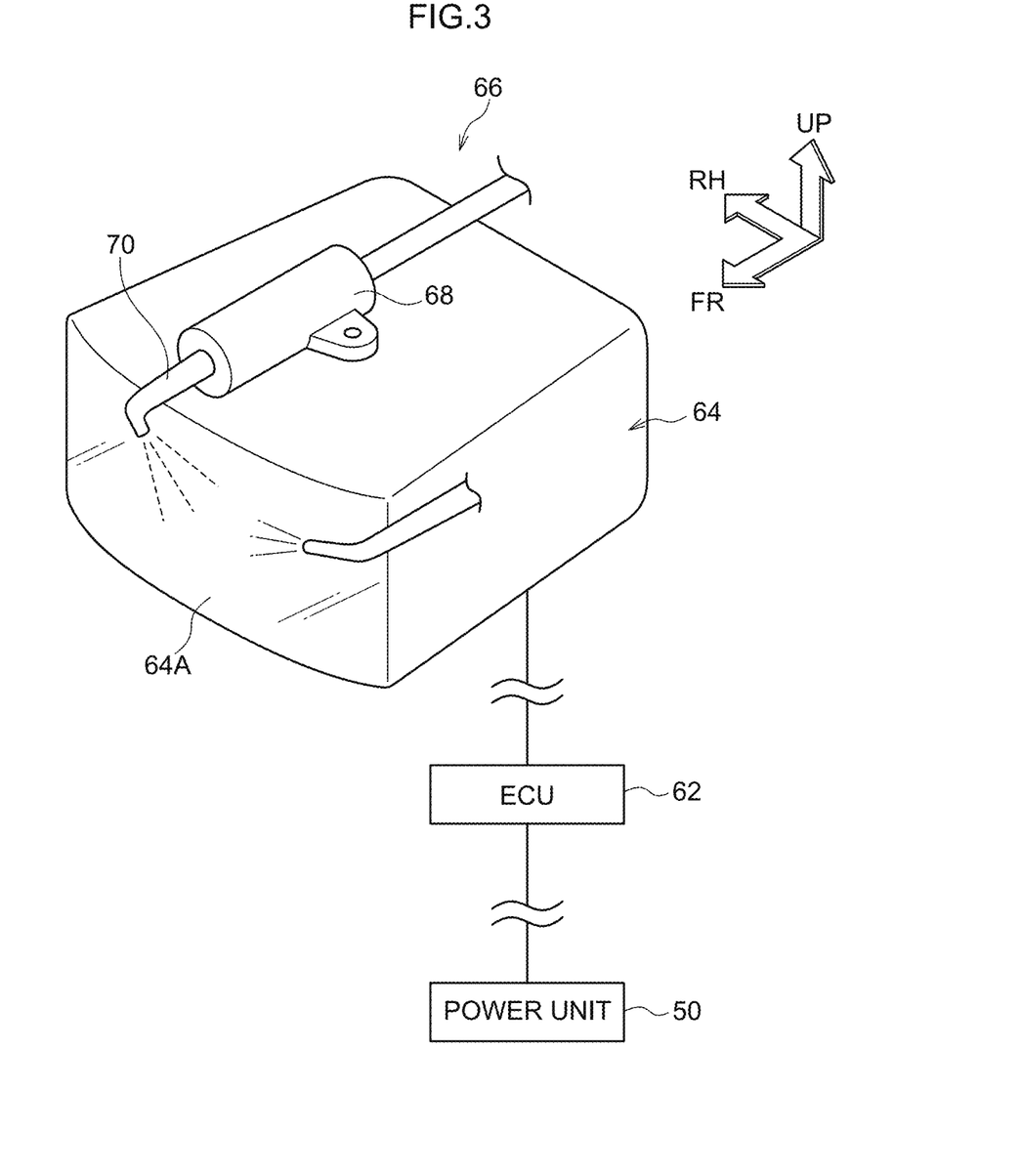
FIG. 3 is a perspective view schematically showing structures at the periphery of a sensor at the vehicle to which is applied the compressor installation structure for a vehicle relating to the present embodiment.

Further, as shown in FIG. 3, an autonomous driving ECU (Electronic Control Unit) 62, which can carry out autonomous driving of the vehicle 10 by controlling the power unit 50 and the like, is installed in the vehicle 10. As shown in FIG. 2 as well, plural "sensors 64", which can acquire the situation at the periphery of the vehicle, are disposed at the vehicle body 12 at the portion that is at the vehicle front side of the condenser 48 and the portion that is at the vehicle front side of the roof portion. These sensors 64 can communicate with the autonomous driving ECU 62.

On the basis of signals that are transmitted from these sensors 64, the autonomous driving ECU 62 can judge the situation at the periphery of the vehicle 10, i.e., the absence/presence of objects near the vehicle 10, and the like. Note that a camera that captures images of a predetermined range, millimeter wave radar that transmits search signals over a predetermined range, LIDAR (Light Detection and Ranging/Laser Imaging Detection and Ranging) that senses a predetermined range, and the like are examples of the sensors 64. Note that the sensors 64 are disposed also at the vehicle rear side portion of the vehicle body 12.

As shown in FIG. 1 and FIG. 2 as well, a washing unit 66, which can wash "detection surfaces 64A" of the sensors 64, is installed at the vehicle 10. This washing unit 66 has an unillustrated reservoir tank in which washing liquid is stored, a pressurizing device 68 that draws-in and pressurizes washing liquid from the reservoir tank, and nozzles 77 that jet-out, toward the detection surfaces 64A, washing liquid that has been pressurized by the pressurizing device 68. Note that the washing unit 66 is driven on the basis of control signals from the autonomous driving ECU 62 or control signals given by operation of an operation portion by a driver.

The washing liquid that remains on the detection surface 64A after washing of the detection surface 64A is removed from the detection surface 64A by compressed air that is supplied from the compressor 72 for cleaning.

Here, in the present embodiment, the compressor installation structure for a vehicle relating to the present embodiment is applied to the compressor 72 for cleaning and the compressor 74 for air conditioning. The peripheral structures of the compressor 74 for air conditioning and the compressor 72 for cleaning, and the structures of a "tube portion 76 for air conditioning" that is connected to the compressor 74 for air conditioning and a "tube portion 78 for cleaning" that is connected to the compressor 72 for cleaning, are described in detail hereinafter.

As shown in FIG. 1 and FIG. 2, the outer shape of the compressor 74 for air conditioning is the shape of a cylinder whose length direction is the vehicle front-rear direction, and the compressor 74 for air conditioning is a scroll compressor. The compressor 74 for air conditioning compresses coolant that is sent from an unillustrated evaporator side, and can send the compressed coolant to the condenser 48 via the tube portion 76 for air conditioning.

Further, the compressor 74 for air conditioning is disposed at the vehicle width direction right side with respect to the vehicle width direction center of the vehicle 10, and, as seen from the vehicle vertical direction, is disposed between the third cross portion 34 of the frame 14 and the battery pack 42. The compressor 74 for air conditioning is fixed to the frame 14 via a front side base portion 80, a rear side base portion 82, a connecting reinforcement 84, and a supporting member 86.

The front side base portion 80 is provided at the vehicle width direction right side portion of the third cross portion 34. The main portion of the front side base portion 80 is shaped as a plate that extends-out toward the vehicle rear side from the third cross portion 34 and whose plate thickness direction is the vehicle vertical direction.

On the other hand, the rear side base portion 82 is provided at the vehicle width direction right side portion at the vehicle front side portion of the battery case 44. The main portion of the rear side base portion 82 is shaped as a plate that extends-out toward the vehicle front side from the battery case 44 and whose plate thickness direction is the vehicle vertical direction.

The connecting reinforcement 84 is shaped as an angular tube that extends in the vehicle front-rear direction and whose cross-section, as seen from the vehicle front-rear direction, is a closed cross-section. In the state of being supported from the vehicle lower side by the front side base portion 80 and the rear side base portion 82, the connecting reinforcement 84 is fixed to these by unillustrated fastening members. Namely, the connecting reinforcement 84 is in a state of spanning between the third cross portion 34 and the battery pack 42.

The supporting member 86 is structured by a plate member that is made of metal being bent, and is fastened to the compressor 74 for air conditioning and the connecting reinforcement 84 by unillustrated fastening members. Namely, the compressor 74 for air conditioning is supported at the connecting reinforcement 84 via the supporting member 86.

On the other hand, the tube portion 76 for air conditioning is structured by a tube member that is made of metal. One end portion thereof is connected to the compressor 74 for air conditioning, and the other end portion thereof is connected to the condenser 48. This tube portion 76 for air conditioning is disposed along the vehicle width direction inner side surface of the side frame portion 28 that is that the vehicle width direction right side, and is fixed by unillustrated mounting members to plural places of this side frame portion 28.

On the other hand, the compressor 72 for cleaning is basically structured similarly to the compressor 74 for air conditioning, and can send compressed air to the tube portion 78 for cleaning.

The compressor 72 for cleaning is disposed at the vehicle width direction left side with respect to the vehicle width direction center of the vehicle 10, and, as seen from the vehicle vertical direction, is disposed between the third cross portion 34 of the frame 14 and the battery pack 42. The compressor 72 for cleaning is fixed to the frame 14 via a front side base portion 88, a rear side base portion 90, a connecting reinforcement 92, and a supporting member 94.

The front side base portion 88 is structured similarly to the front side base portion 80, and is provided at the vehicle width direction left side portion of the third cross portion 34. Further, the rear side base portion 90 is structured similarly to the rear side base portion 82, and is provided at the vehicle width direction left side portion at the vehicle front side portion of the battery case 44.

The connecting reinforcement 92 is structured similarly to the connecting reinforcement 84, and, in the state of being supported from the vehicle lower side by the front side base portion 88 and the rear side base portion 90, the connecting reinforcement 92 is fixed to these by unillustrated fastening members. Namely, the connecting reinforcement 92 is in a state of spanning between the third cross portion 34 and the battery pack 42.

The supporting member 94 is structured similarly to the supporting member 86, and is fastened to the compressor 72 for cleaning and the connecting reinforcement 92 by unillustrated fastening members.

On the other hand, the tube portion 78 for cleaning is structured by a tube member that is made of metal. One end portion thereof is connected to the compressor 72 for cleaning. At a place at which the tube portion 78 for cleaning extends-out by a predetermined length from the compressor 72 for cleaning, the tube portion 78 for cleaning is bifurcated into a first tube portion 78A and a second tube portion 78B.

The main portion of the first tube portion 78A is disposed along the vehicle width direction inner side surface of the side frame portion 28 that is at the vehicle width direction left side. The vehicle front side portion of the first tube portion 78A extends in the vehicle width direction. Further, the vehicle front side portion of the first tube portion 78A forks-off at plural places, and, as shown in FIG. 3, the end portions of these portions open toward the detection surfaces 64A of the sensors 64 that are disposed at the vehicle front side of the condenser 48.

Returning to FIG. 1, the second tube portion 78B passes-through the interior of the pillar portion 20 that is at the vehicle front side and the vehicle width direction left side, and extends-out toward the vehicle upper side. At the upper end portion of this pillar portion 20, the second tube portion 78B is bent toward the vehicle front side, and is disposed along a roof side rail of the roof portion. Then, the vehicle front side portion of the second tube portion 78B extends in the vehicle width direction, and is forked-off at plural places. The end portions of these portions open toward the detection surfaces 64A of the sensors 64 that are disposed at the vehicle front side of the roof portion.

(Operation and Effects of Present Embodiment) Operation and effects of the present embodiment are described next.

In the present embodiment, as shown in FIG. 1 and FIG. 2, the compressor 74 for air conditioning, the compressor 72 for cleaning, and the battery pack 42 that supplies electric power to these are provided. A gas is compressed by the compressor for air conditioning and the compressor 72 for cleaning, and the compressed gas can be sent to various devices.

By the way, it is thought that, when collision load is input to the compressor 74 for air conditioning and the compressor 72 for cleaning, a compressed gas is jetted-out from the compressor 74 for air conditioning and the compressor 72 for cleaning, or the like. Accordingly, when collision load in the vehicle front-rear direction is input to the vehicle 10, it is preferable to be able to suppress the input of that collision load to the compressor 74 for air conditioning and the compressor 72 for cleaning.

Here, in the present embodiment, the battery pack 42 is disposed at the vehicle lower side of the floor portion 18 of the vehicle cabin 16, and the power unit 50 is disposed at the vehicle front side with respect to the battery pack 42. Further, the compressor 74 for air conditioning and the compressor 72 for cleaning are disposed at the vehicle front side with respect to the battery pack 42, and are disposed at the vehicle rear side with respect to the power unit 50.

Therefore, in the present embodiment, the collision load in the vehicle front-rear direction that is input to the vehicle 10 is input to the battery pack 42 or the power unit 50, before the compressor 74 for air conditioning and the compressor 72 for cleaning. Accordingly, in the present embodiment, the collision load in the vehicle front-rear direction that is input to the vehicle 10 affecting the compressor 74 for air conditioning and the compressor 72 for cleaning can be suppressed.

By the way, it is thought that, in a structure in which a pair of compressors, i.e., the compressor 74 for air conditioning and the compressor 72 for cleaning, are disposed in a row in the vehicle front-rear direction, at the time when collision load in the vehicle front-rear direction is input to the vehicle 10, the compressor 74 for air conditioning and the compressor 72 for cleaning affect one another.

Here, in the present embodiment, the compressor 74 for air conditioning and the compressor 72 for cleaning are disposed with an interval therebetween in the vehicle width direction. Therefore, the compressor 74 for air conditioning and the compressor 72 for cleaning affecting one another due to collision load in the vehicle front-rear direction that is input to the vehicle 10, can be suppressed. Accordingly, in the present embodiment, the compressor 74 for air conditioning and the compressor 72 for cleaning can be protected from collision load in the vehicle front-rear direction that is input to the vehicle 10.

Further, in the present embodiment, the sensors 64 that can acquire the situation at the periphery of the vehicle 10, and the tube portion 78 for cleaning are provided. The end portions of the tube portion 78 for cleaning open toward the detection surfaces 64A of the sensors 64.

Moreover, in the present embodiment, one compressor among the pair of compressors is the compressor 72 for cleaning, and compressed air is supplied from the compressor 72 for cleaning to the tube portion 78 for cleaning. As a result, the compressed air that is supplied to the tube portion 78 for cleaning is jetted-out from the end portions of the tube portion 78 for cleaning toward the detection surfaces 64A of the sensors 64, and can clean the detection surfaces 64A.

Further, the sensors 64 are disposed at the vehicle front side of the compressor 72 for cleaning, and the tube portion 78 for cleaning extends toward the vehicle front side from the compressor 72 for cleaning. Therefore, the tube portion 78 for cleaning, i.e., the path of the compressed air, becoming long can be suppressed. Accordingly, in the present embodiment, the piping relating to cleaning of the sensors 64 can be simplified, while the performances of the sensors 64 are maintained.

Moreover, in the present embodiment, the condenser 48 that structures a portion of the air conditioner 46, and the tube portion 76 for air conditioning are provided. The tube portion 76 for air conditioning is connected to the condenser 48.

Further, in the present embodiment, the other compressor of the pair of compressors is the compressor 74 for air conditioning. Coolant of the air conditioner 46, which has been compressed at the compressor 74 for air conditioning, is sent to the tube portion 76 for air conditioning. On the other hand, at the condenser 48, the coolant, which has been sent from the compressor 74 for air conditioning via the tube portion 76 for air conditioning, is condensed by heat exchange with air.

Moreover, the condenser 48 is disposed at the vehicle front side of the compressor 74 for air conditioning, and the tube portion 76 for air conditioning extends toward the vehicle front side from the compressor 74 for air conditioning. Therefore, the tube portion 76 for air conditioning, i.e., the path of the coolant, becoming long can be suppressed. Accordingly, in the present embodiment, the piping at the periphery of the air conditioner 46 can be simplified.

In addition, in the present embodiment, the frame 14 is disposed at the vehicle lower side of the vehicle body 12 that has the vehicle cabin 16, and the vehicle body 12 is supported by the frame 14 from the vehicle lower side. The frame 14 has the pair of side frame portions 28, which are disposed with an interval therebetween in the vehicle width direction and which extend in the vehicle front-rear direction, and the third cross portion 34 that spans between the side frame portions 28.

Here, in the present embodiment, the third cross portion 34 is disposed at the vehicle rear side with respect to the power unit 50, and the compressor 74 for air conditioning and the compressor 72 for cleaning are disposed at the vehicle rear side with respect to the third cross portion 34. Therefore, collision load from the vehicle front side that is input to the vehicle 10 is input to the third cross portion 34 before the compressor 74 for air conditioning and the compressor 72 for cleaning. Accordingly, in the present embodiment, collision load from the vehicle front side, which is input to the vehicle 10, affecting the compressor 74 for air conditioning and the compressor 72 for cleaning can be suppressed.

Supplementary Description of the Above Embodiment (1) In the above-described embodiment, the compressor installation structure for a vehicle relating to the embodiment is applied to a portion that is at the vehicle front side of the vehicle 10. However, depending on the specifications of the vehicle 10 and the like, the compressor installation structure for a vehicle may be applied to the vehicle rear side portion of the vehicle 10.

(2) Further, in the above-described embodiment, the respective compressors are supported by the third cross portion 34 and the battery pack 42, but the present disclosure is not limited to this. Namely, depending on the specifications of the vehicle 10 and the like, the respective compressors may be supported by a different cross portion that spans between the side frame portions 28.

(3) In addition, in the above-described embodiment, one of each of the compressor 74 for air conditioning and the compressor 72 for cleaning are provided, but the present disclosure is not limited to this. Namely, depending on the specifications of the vehicle 10 and the like, plural compressors 74 for air conditioning and compressors 72 for cleaning may be disposed between the power unit 50 and the battery pack 42. Further, at least one of the compressor 74 for air conditioning and the compressor 72 for cleaning may be disposed, or a compressor that has an application that is different than these may be disposed, between the power unit 50 and the battery pack 42.

What is claimed is:

1. A compressor installation structure for a vehicle, the structure comprising:
    a battery that is disposed at a vehicle lower side of a floor portion of a vehicle cabin;
    a power unit that is disposed at one side in a vehicle front-rear direction of the vehicle with respect to the battery; and
    a pair of compressors disposed with an interval therebetween in a vehicle width direction of the vehicle,
    wherein
    the pair of compressors is configured to be driven by electric power supplied thereto from the battery, and is disposed between the battery and the power unit in the vehicle front-rear direction,
    one of the pair of compressors is disposed at a left side in the vehicle width direction with respect to a vehicle width direction center of the vehicle, and
    another of the pair of compressors is disposed at a right side in the vehicle width direction with respect to the vehicle width direction center of the vehicle.

2. The compressor installation structure of claim 1, wherein
    the pair of compressors includes a first compressor for cleaning that is configured to supply compressed air, and
    the compressor installation structure further comprises a first tube portion for cleaning,
        the first tube portion having an end portion that opens toward a detection surface of a sensor configured to acquire a peripheral situation of the vehicle and disposed at one side, in the vehicle front-rear direction, of the first compressor for cleaning,
        the first tube portion for cleaning extending from the first compressor for cleaning toward said one side of the first compressor in the vehicle front-rear direction, and being configured to supply the compressed air from the first compressor for cleaning.

3. The compressor installation structure of claim 2, wherein
    the pair of compressors includes a second compressor for air conditioning that is configured to compress coolant that is used in an air conditioner, and
    the compressor installation structure further comprises a second tube portion for air conditioning that is connected to a condenser, which is configured to condense the coolant by heat exchange with air, which is disposed at one side, in the vehicle front-rear direction, of the second compressor for air conditioning and which structures a portion of the air conditioner,
        the second tube portion for air conditioning extending from the second compressor for air conditioning toward said one side of the second compressor in the vehicle front-rear direction to allow the coolant, which has been compressed by the compressor for air conditioning, to be delivered to the second tube portion for air conditioning.

4. The compressor installation structure of claim 1, further comprising:
    a frame that is disposed at a vehicle lower side of a vehicle body that is provided with the vehicle cabin, that is configured to support the vehicle body from the vehicle lower side, and that has a pair of side frame portions that are disposed with an interval provided therebetween in the vehicle width direction and extend in the vehicle front-rear direction; and
    a cross portion that spans between the pair of side frame portions,
    wherein
    the cross portion is disposed between the power unit and the pair of compressors in the vehicle front-rear direction.

5. The compressor installation structure of claim 4, wherein
    the cross portion is disposed between the battery and the power unit in the vehicle front-rear direction, and
    each of the pair of compressors is disposed between the cross portion and the battery in the vehicle front-rear direction, and supported by the cross portion and the battery.

6. The compressor installation structure of claim 5, wherein
    the pair of compressors includes a first compressor for cleaning that is configured to supply compressed air, and
    the compressor installation structure further comprises a first tube portion for cleaning, the first tube portion having an end portion that opens toward a detection surface of a sensor configured to acquire a peripheral situation of the vehicle and disposed at one side, in the vehicle front-rear direction, of the first compressor for cleaning, and the first tube portion for cleaning extending from the first compressor for cleaning toward said one side of the first compressor in the vehicle front-rear direction, and being configured to supply the compressed air from the first compressor for cleaning.

7. The compressor installation structure of claim 6, wherein the pair of compressors includes a second compressor for air conditioning that is configured to compress coolant that is used in an air conditioner, and the compressor installation structure further comprises a second tube portion for air conditioning that is connected to a condenser, which is configured to condense the coolant by heat exchange with air, which is disposed at one side, in the vehicle front-rear direction, of the second compressor for air conditioning and which structures a portion of the air conditioner, the second tube portion for air conditioning extending from the second compressor for air conditioning toward said one side of the second compressor in the vehicle front-rear direction to allow the coolant, which has been compressed by the compressor for air conditioning, to be delivered to the second tube portion for air conditioning.

8. The compressor installation structure of claim 7, wherein the first tube portion includes a main portion extends along an inner side surface of one side frame portion of the pair of side frame portions in the vehicle front-rear direction, and a vehicle front side portion extending from the main portion in the vehicle width direction.

9. The compressor installation structure of claim 8, wherein the second tube portion extends along an inner side surface of another side frame portion of the pair of side frame portions in the vehicle front-rear direction.

* * * * *